July 14, 1959  P. SPENCE  2,894,399
ROTARY-STEM ACTUATING MEANS
Filed July 13, 1954
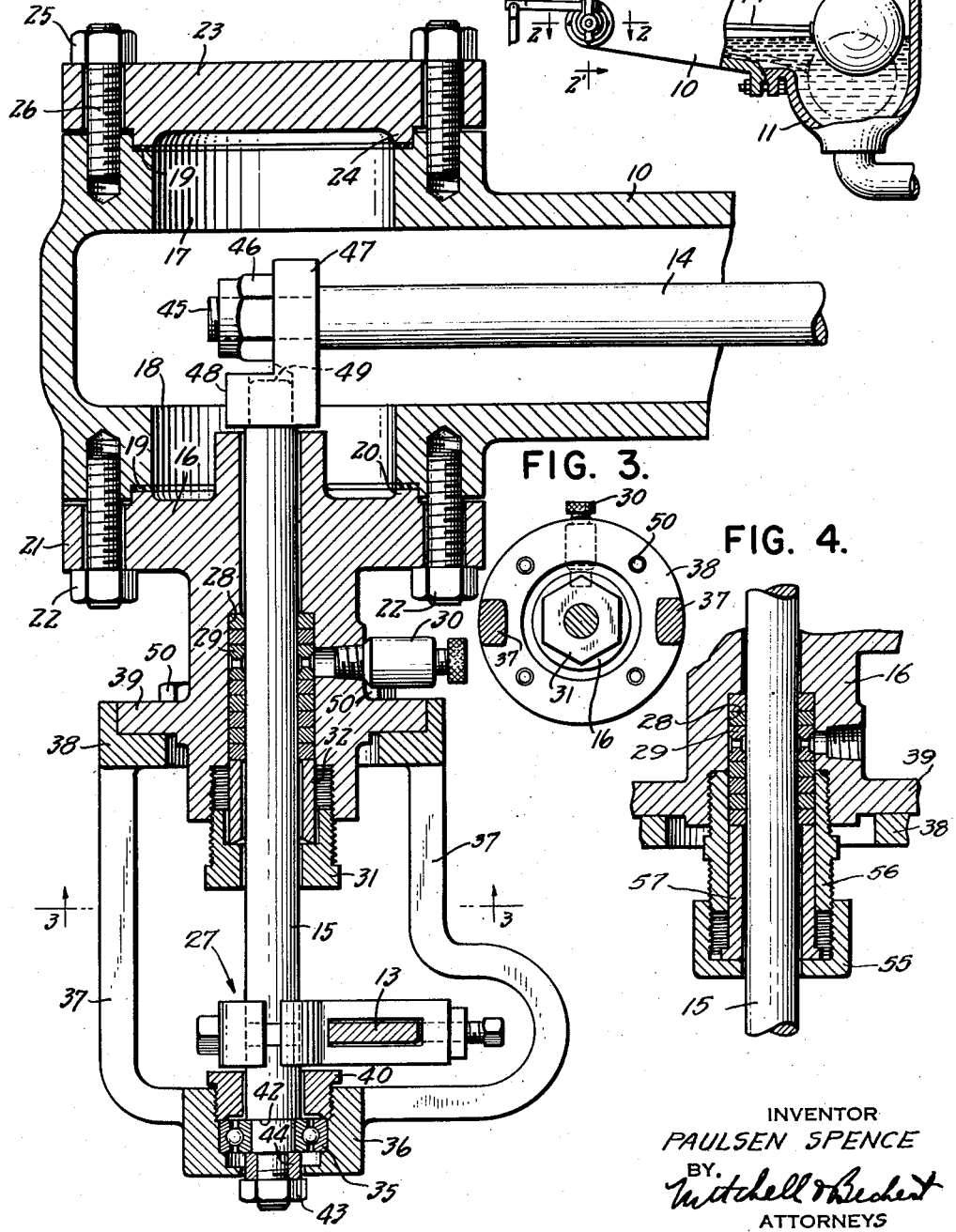
INVENTOR
PAULSEN SPENCE
BY
Mitchell & Bechert
ATTORNEYS

United States Patent Office 2,894,399
Patented July 14, 1959

2,894,399

ROTARY-STEM ACTUATING MEANS

Paulsen Spence, Baton Rouge, La.

Application July 13, 1954, Serial No. 442,986

1 Claim. (Cl. 74—96)

My invention relates to an improved rotary-stem construction for a float-operated or the like mechanism.

It is an object to provide an improved device of the character indicated.

It is another object to provide an improved rotary-stem mount selectively adaptable to a float housing or to a rotary-stem valve or the like housing in either of two reversed positions, depending on installation requirements.

It is another object to provide an improved rotary-stem construction characterized by consistently smooth action whether the float or valve chamber is under pressure or is subjected to vacuum.

It is a more general object to meet the above objects with a construction lending itself to ready maintenance and to flexible adaptation in a plurality of possible installations and to ready accessibility of important parts.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Fig. 1 is a simplified side elevation in partial section showing a float chamber with a float-arm housing incorporating features of the invention;

Fig. 2 is an enlarged sectional view, the upper half of which is taken in the plane 2—2 of Fig. 1 and the lower half of which is taken in the plane 2'—2' of Fig. 1;

Fig. 3 is a sectional view taken in the plane 3—3 of Fig. 2; and

Fig. 4 is a fragmentary sectional view illustrating an alternative packing arrangement for that shown in Fig. 2.

Briefly stated, my invention contemplates the combination of a bonnet-mounted rotary stem with a float-arm or valve housing in such a way that a unit-handling assembly including the stem may be selectively mounted in either of two opposed positions, and in a variety of angularly orientations. For this purpose, the float-arm or valve-crank housing may be provided with aligned opposed openings which are duplicates of each other on opposite sides of the outwardly projecting end of the float-arm or valve-crank housing. The unit-handling assembly including the bonnet-mounted rotary stem may be secured to the housing at one of the openings, and a blind flange or cover may be secured over the other opening. In the unit-handling assembly, the rotary stem may be supported in part by stuffing means and in part by anti-friction-bearing means carried at an outboard-bearing support. By employment of combination radial-and-thrust elements for the bearing, the assembly will function without axial play whether the housing or chamber is under pressurized or vacuum conditions. Other features will appear from the detailed description which follows.

Referring to Fig. 1 of the drawings, my invention is shown in specific application to a side or float-arm housing 10 secured to a float-chamber 11 containing a float 12, the vertical position of which is to provide an external indication or is to operate external mechanism, as through a crank or lever 13. The float 12 may be carried at the end of a float arm or rod 14 secured to a rotary stem or shaft 15 (Fig. 2) passing through a bonnet 16, the latter being removably carried by the float-arm housing 10. Adjustable clamping means 27 connects arm 13 in cranking or cranked relation with the pivot shaft or rotary stem 15.

In accordance with the invention, I so form the bonnet 16 and the float-arm housing 10 that the bonnet 16 may be selectively connected to said housing to meet a variety of installation requirements. For this purpose, the outer end of the float-arm housing 10 is provided with openings 17—18 which may be duplicates of each other and formed on aligned axes on opposite sides of the housing 10. Each of the openings 17—18 is preferably counterbored, as at 19, to receive sealing means, such as the gasket shown, as well as a projecting part 20 of the flange 21 of bonnet 16. The bonnet 16 may be removably secured by means 22 at equal angularly spaced locations about the axis of stem 15. On the opposite side of the float-arm housing, the otherwise unused opening 17 may be closed by a blind flange or cover 23 having a projecting part 24 duplicating that at 20 on the bonnet 16 and again secured by means 25, corresponding to securing means 22 for the bonnet.

The body of bonnet 16 may be provided with an elongated counterbore 28 to receive a gland packing comprising a stacked plurality of washers including an intermediate element 29 having openings and manifolds accessible to a lubricant fitting 30 extending radially outward at a convenient angular location. So-called Teflon packing is preferred in the counterbore 28 because of its chemical inertness and antifriction properties, and I also prefer that at the location of axial overlap with the packing, the stem 15 shall be highly polished for minimum friction. The gland may be secured by means of a gland nut 31 driving a loading sleeve 32.

In order to provide wide-base support for the stem 15, the bonnet 16 may carry outboard-bearing means 35, such as an antifriction bearing, preferably of the combination radial-and-thrust type, so as to have substantially no axial play, and located so as to place the crank or lever 13 intermediate bearing 35 and packing 29. The outer ring of the bearing 35 is shown seated against a shoulder in a boss 36, forming part of a yoke 37; the base or mounting ring 38 for yoke 37 may be secured to a flange 39 on the bonnet 16. A nut 40 clamps the outer bearing ring in position; the inner bearing ring is seated against a shoulder 42 at the outer end of the shaft 15, and is clamped in place by means of a nut 43 driving a sleeve 44.

The connection between the inner end of the stem 15 and the float arm 14 is preferably quickly detachable without requiring unthreading rotation of the arm 14. For this purpose, the end of the arm 14 is reduced to define a shoulder so that a transverse bore in the stem means 15 may accommodate this reduced end. The reduced end is shown threaded at 45, and a nut 46 clamps the end of the shaft means 15 to the arm 14. In the form shown, the end of the shaft means 15 is defined as a bracket 47 having a base 48, keyed as by a square-hole fitting the squared end 49 of the stem 15.

In Fig. 4, the gland mechanism resembles that of Fig. 2 except that a cap 55 is adjustably secured to a nipple 56 in order to set the thrust loading on the packing elements 29 via a loading sleeve 57.

The described construction will be seen to be essentially unit-handling and yet to lend itself to a variety of installation requirements by providing for selective mounting of the bonnet (and the subassembly associated therewith) either on the side of housing 10 shown, or on the side accessible through opening 17. Regardless of the side employed for mounting the bonnet 16, a variety of angular positions is available because of the equal spacing of securing means 22 to 25. This will mean that the lubricant fitting 30 may be oriented as desired, whichever the selected mounting side. The side of housing 10 closed by the blind flange 23 provides access for tightening or removal of the arm or crank 14 from the bracket 47, without requiring any unscrewing rotation of the arm 14. As will be seen from Fig. 3, the mounting bolts 50 for securing the base ring 38 of yoke 37 to the bonnet flange 39 are also preferably provided in equally spaced relation about the stem 15 so that the arm 13 may be placed in a desired angular orientation, depending upon installation requirements. This flexible adaptability of my construction is achieved at all times without interference with the lubricant fitting 30, because the latter is angularly located intermediate the placement of adjacent bolt holes in the flanges 21–39; there is never any limitation as to a desired orientation of the lubricant fitting, regardless of the selected relative angular placement of the yoke with respect to the bonnet 16 or of the bonnet 16 with respect to the housing 10. Because of the combination thrust-and-radial nature of the bearing 35, this element need not be reversed or its mounting modified in any way when my rotary-stem device is applied to a chamber 10 under vacuum after having been applied to a chamber 10 under pressure. Also, the location of crank or lever 13 intermediate bearing 35 and packing 29 assures balanced support of the rotary stem and minimum tendency for angular misalignment.

While I have described the invention in detail for the preferrel forms illustrated, it will be understood that modifications may be made within the scope fo the invention as defined in the claim which follows.

I claim:

In combination, a housing having opposed side walls, one of said walls having an opening therethrough bordered by a flange seat, a unit handling bonnet having a securing flange fitting said flange seat, a plurality of screw members equally spaced circumferentially of said flange and flange seat for securing said bonnet to said housing over said opening and provided for fastening said bonnet fluid tight to said housing in a plurality of angular positions, a swinging arm in said housing and extending to a point therein substantially over said opening, said bonnet having a bore therethrough substantially concentric therewith and with said opening, a pivot shaft extending through the bore in said bonnet, a fitting non-rotatable on the inner end of said pivot shaft and being within said housing, said fitting having a transverse aperture therein, the end of said swinging arm extending through said aperture and a nut on the end of said swinging arm to hold the latter in said transverse aperture, said bonnet having a stuffing box and bearing for said pivot shaft, a yoke having a flange connection to said bonnet, said yoke having a ball bearing seat therein concentric with said pivot shaft and spaced substantially from the end of said bonnet and stuffing box, an outer bearing ring in said seat and means for holding the same against axial movement in both directions, an inner bearing ring on the end of said pivot shaft and secured thereon against axial movement thereon in both directions, bearing balls between said outer and inner bearing rings, said outer and inner bearing rings and bearing balls comprising a combined radial and thrust load bearing, whereby said radial and thrust load bearing serves as an outboard bearing for the outer end of said first shaft and holds the latter against axial movement in both directions, a lever device removably carried by said pivot shaft in the yoke and between the bonnet and the outboard bearing, said housing having a second opening in the wall opposite said first opening, a removable cover for said second opening, said second opening being of a size to give tool access to said fixture and nut holding said swinging arm and pivot shaft together, said first opening being of a size to permit axial withdrawal of said fixture when said bonnet, yoke and pivot shaft are removed as a unit in a direction axially of said pivot shaft.

References Cited in the file of this patent
UNITED STATES PATENTS

| | | |
|---|---|---|
| 959,708 | Brown | May 31, 1910 |
| 1,622,016 | Wilson | Mar. 22, 1927 |
| 1,685,527 | Eige | Sept. 25, 1928 |
| 1,817,379 | Kallmeyer | Aug. 4, 1931 |
| 1,821,699 | Fleck | Sept. 1, 1931 |
| 1,884,929 | Veenschoten | Oct. 25, 1932 |
| 2,053,783 | Ruesenberg | Sept. 8, 1936 |
| 2,154,964 | Temple | Apr. 18, 1939 |
| 2,584,252 | Bourgeois | Feb. 5, 1952 |
| 2,615,763 | Wolford | Oct. 28, 1952 |